(12) United States Patent
Sharp

(10) Patent No.: US 7,051,867 B2
(45) Date of Patent: May 30, 2006

(54) BELT ALIGNMENT SYSTEM

(76) Inventor: David A. Sharp, 1497 Gold Mine Road, Timmins, Ontario (CA) P4N 7C2

( * ) Notice: Subject to any disclaimer, the term of this patent is extended or adjusted under 35 U.S.C. 154(b) by 0 days.

(21) Appl. No.: 10/766,417

(22) Filed: Jan. 27, 2004

(65) Prior Publication Data

US 2004/0256199 A1  Dec. 23, 2004

(30) Foreign Application Priority Data

Feb. 10, 2003 (CA) ................... 2419286

(51) Int. Cl.
*B65G 39/16* (2006.01)
(52) U.S. Cl. ................... 198/806; 198/808
(58) Field of Classification Search ........... 198/806, 198/808, 840
See application file for complete search history.

(56) References Cited

U.S. PATENT DOCUMENTS

| | | | | |
|---|---|---|---|---|
| 2,132,052 A | * | 10/1938 | Sollenberger | 198/808 |
| 2,132,053 A | * | 10/1938 | Sollenberger et al. | 198/808 |
| 3,066,547 A | * | 12/1962 | Evans et al. | 198/806 |
| 3,187,881 A | * | 6/1965 | Clark | 198/840 |
| 3,368,665 A | * | 2/1968 | Jinkins | 198/806 |
| 4,072,611 A | | 2/1978 | Davis | |
| 4,092,914 A | * | 6/1978 | Burrough et al. | 198/806 |
| 4,231,161 A | | 11/1980 | Belfiore | |
| 4,527,440 A | | 7/1985 | Heitman et al. | |
| 4,693,363 A | | 9/1987 | Kuehnert | |
| 5,117,969 A | | 6/1992 | Roth | |
| 6,131,726 A | * | 10/2000 | Hovsto et al. | 198/806 |

\* cited by examiner

*Primary Examiner*—Gene O. Crawford
*Assistant Examiner*—Mark A. Deuble
(74) *Attorney, Agent, or Firm*—Greer, Burns & Crain, Ltd.

(57) ABSTRACT

The present invention relates to a conveyor belt alignment system comprising pivoting members mounted on a support bracket adaptedly operating through a guide control bar having guide rollers for controlling lateral movements of the belt, the control bar activating the pivoting members through torque arms thereby continuously monitoring the axis of the belt and thereby re-positioning as needed.

6 Claims, 7 Drawing Sheets

FIGURE #1

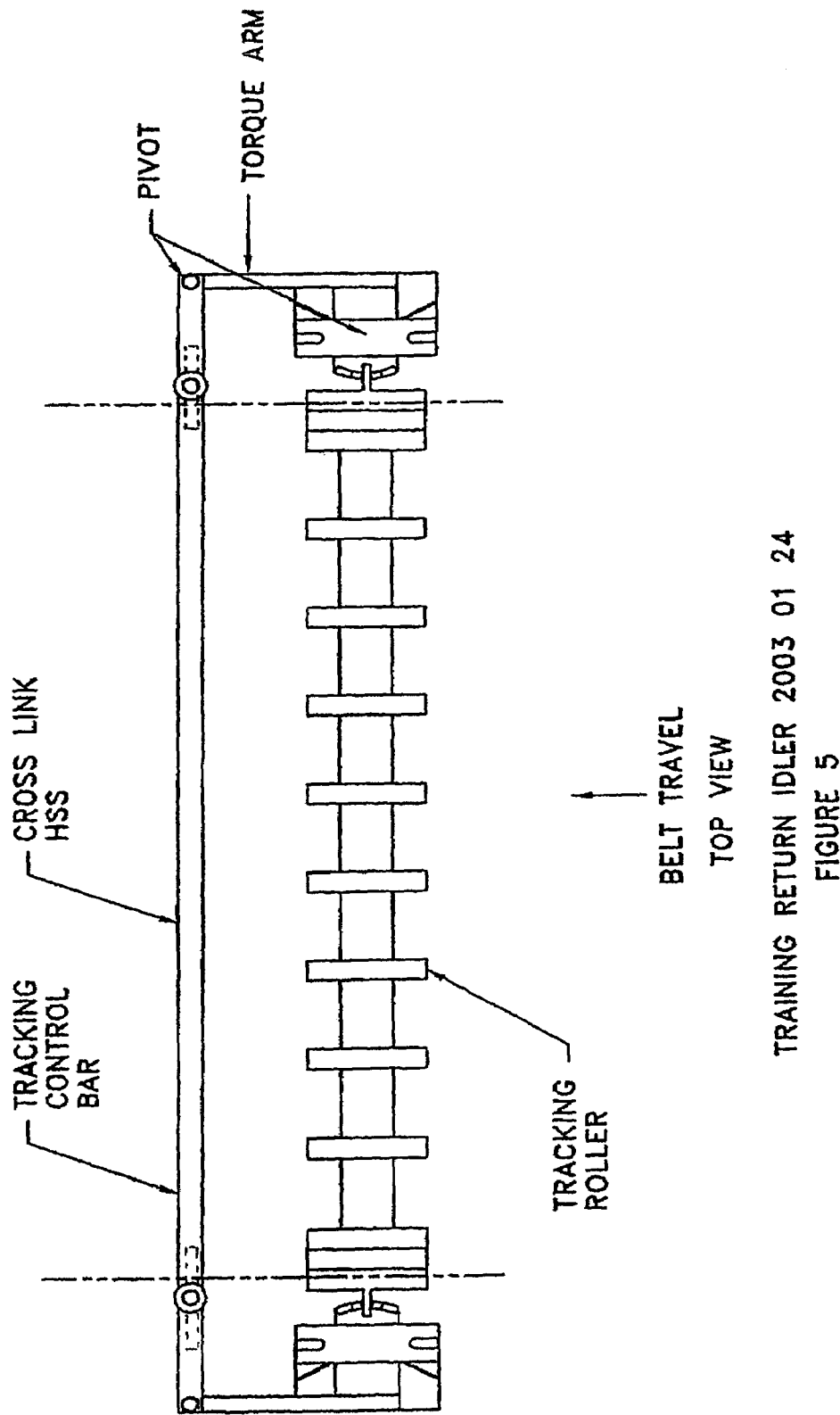

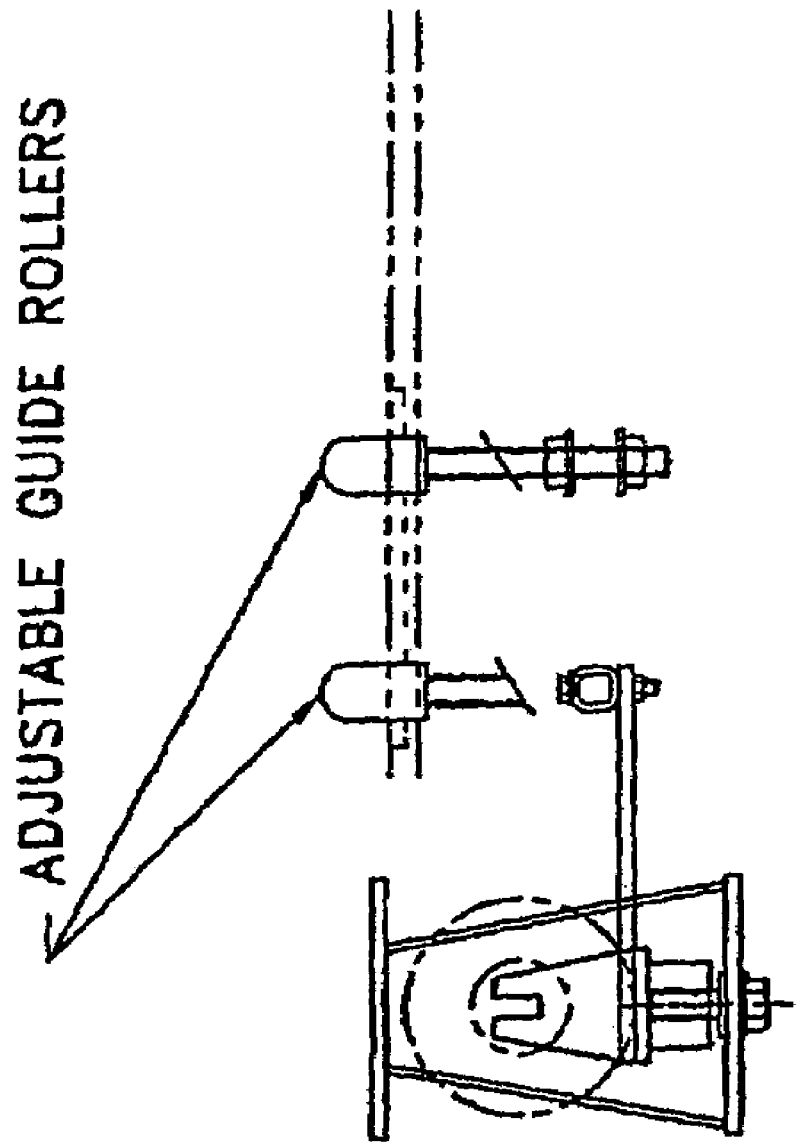

SECTION A-A

BELT ALIGNMENT SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENCE LISTING"

Not applicable.

FIELD OF INVENTION

The present invention relates to the operation of conveyor belts, and more particularly to a system for continuous alignment of a conveyor belt.

BACKGROUND

Belt tracking is a problem in any industry that uses conveyor belts. It is often not a major problem but rather a maintenance nuisance that progressively over time becomes a major cost.

Several factors can affect belt tracking. Misalignment of the rollers will cause corresponding belt tracking problems. Uneven loading of conveyor belts may also cause tracking problems as well as unequal driving forces across the belt width.

Further, it is common for a tracking device for conveyor belts to fail prematurely. Carry back material (material that has not been removed by a belt scraper at the conveyor discharge point) for instance may cause material build up and result in the rollers and pivot mechanism to seize into a misalignment position.

Various conveyor belt systems have been developed over the years with design considerations relating to accurate tracking. Within any belt the ability to track will vary considerably and this in turn is due to a number of variables involved in the production of a belt itself. Compounding this problem is the possibility that the belt might be stretched upon installation. Over correction during initial tracking adjustments may result in stretching the belt in inappropriate areas.

It has also been observed that existing tracking devices will only align a conveyor belt once it is way off center thereby resulting in serious damage and down time.

It therefore becomes clear that there exists a need for a compact yet effective system by which a conveyor belt may be selectively held in a prescribed aligned orientation.

SUMMARY OF THE INVENTION

It is therefore an object of the present invention to provide a system which will counteract the non-aligned running of the conveyor belt in order to achieve as straight a belt run as possible.

Another object of the present invention is to achieve aligned revolution of the belt by less expensive means than previously available.

In accordance with one embodiment of the present invention, an alignment system for a conveyor having a conveyor belt trained over rollers on a conveyor frame, the system comprising pivoting members mounted on support brackets, said members further comprising tracking rollers set up in a ball bushing; and a guide control bar incorporating guide rollers adaptedly adjusted to both edges of the belt for controlling lateral movements of said belt, said bar activating the pivoting members through torque arms wherein said belt while traveling along the conveyor is continuously monitored and controlled for lateral movement via the guide rollers.

BRIEF DESCRIPTION OF THE INVENTION

FIG. 2a is a front view of the system of FIG. 2;

FIG. 5 is a top view of the present belt alignment system;

FIG. 5a is front view of the belt alignment system of FIG. 5 with a corresponding belt and carrying idler shown in phantom;

FIG. 5b is a right side view of the belt alignment system of FIG. 5; and

DETAILED DESCRIPTION OF THE INVENTION

Figure 1:
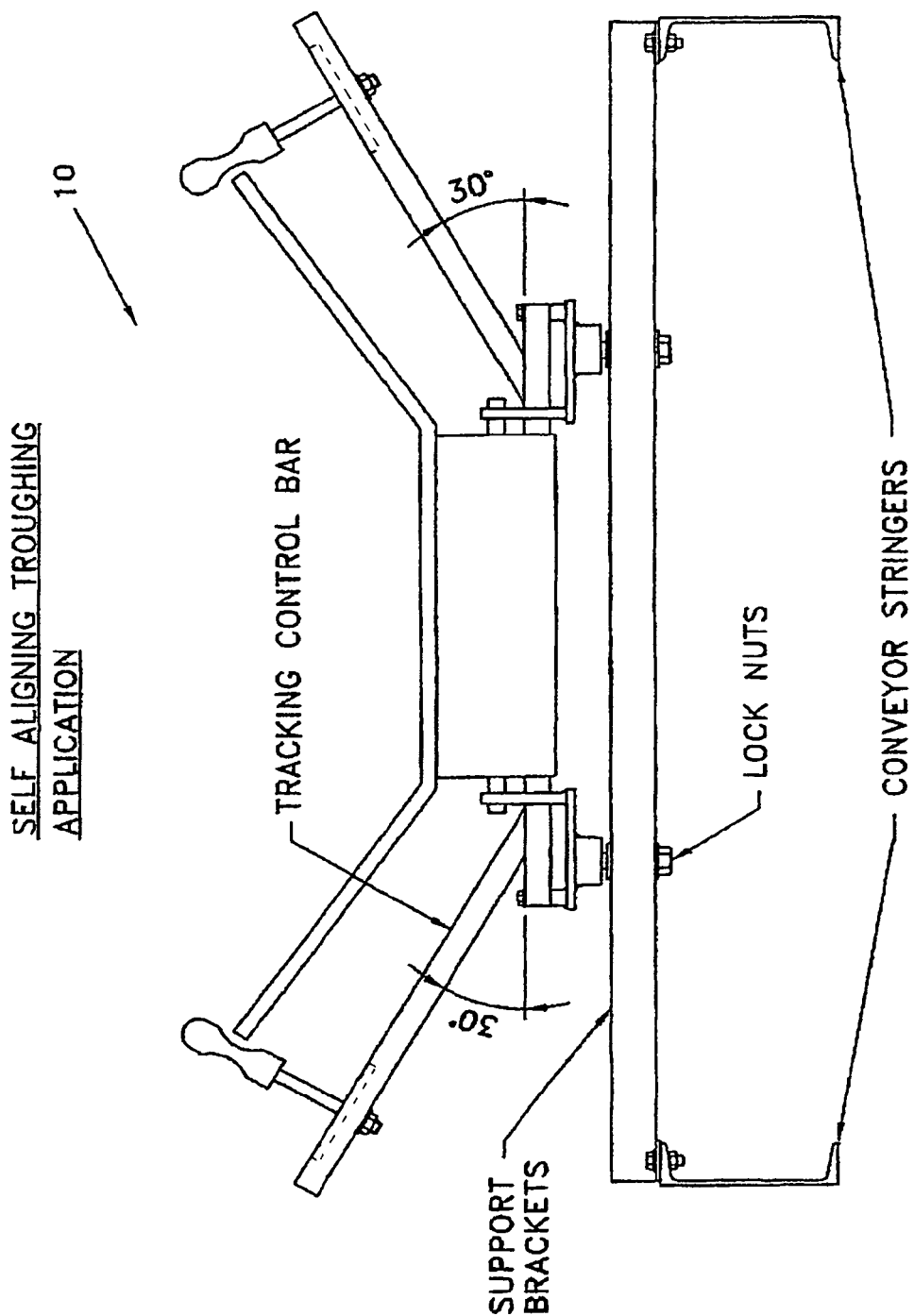
FIG. 1 is an elevation view of a conveyor belt comprising the belt alignment system of the present invention.
Figure 2:
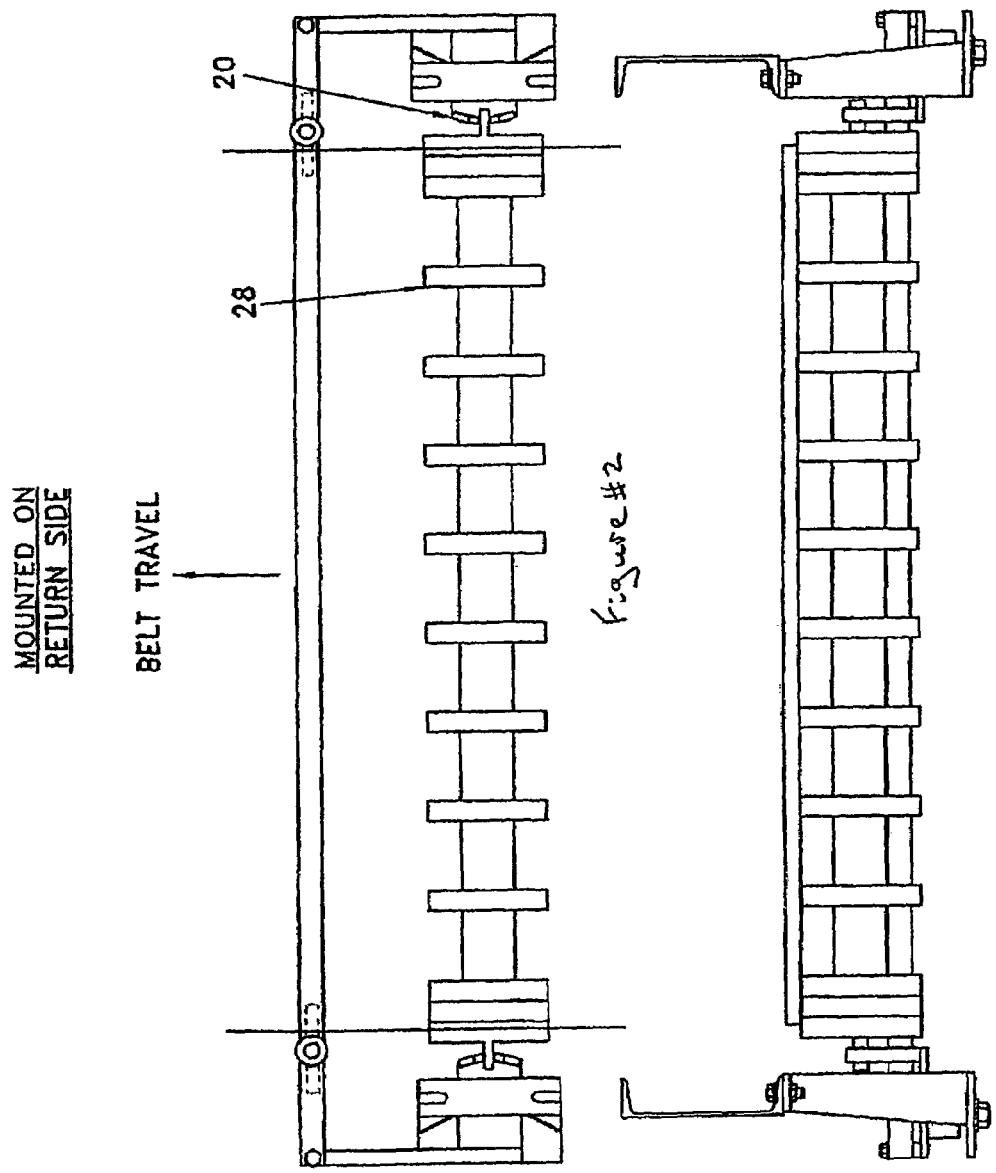
FIG. 2 is a top view of the present system.
Figure 3:
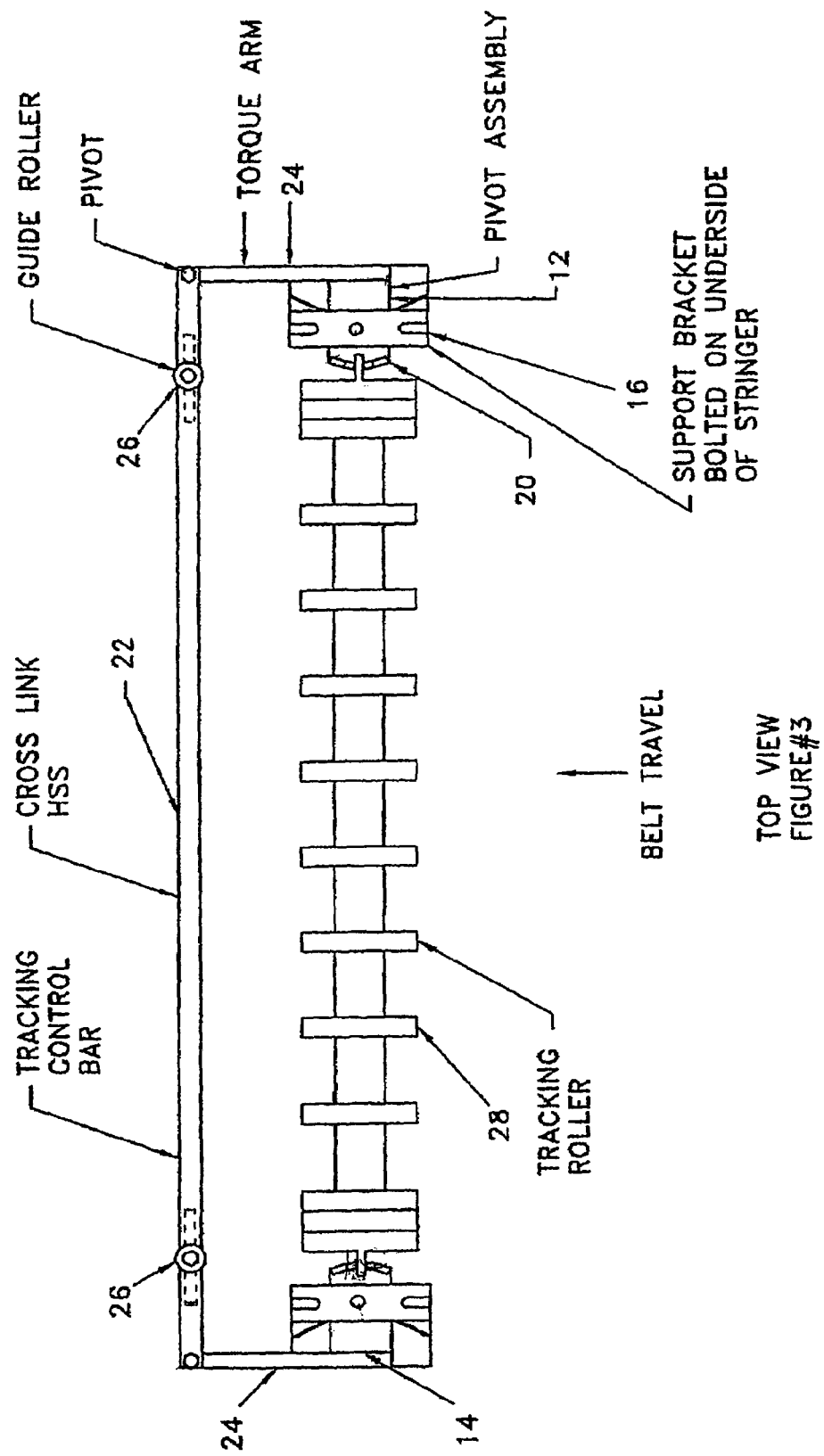
FIG. 3 is a top view of the present alignment system.
Figure 4:
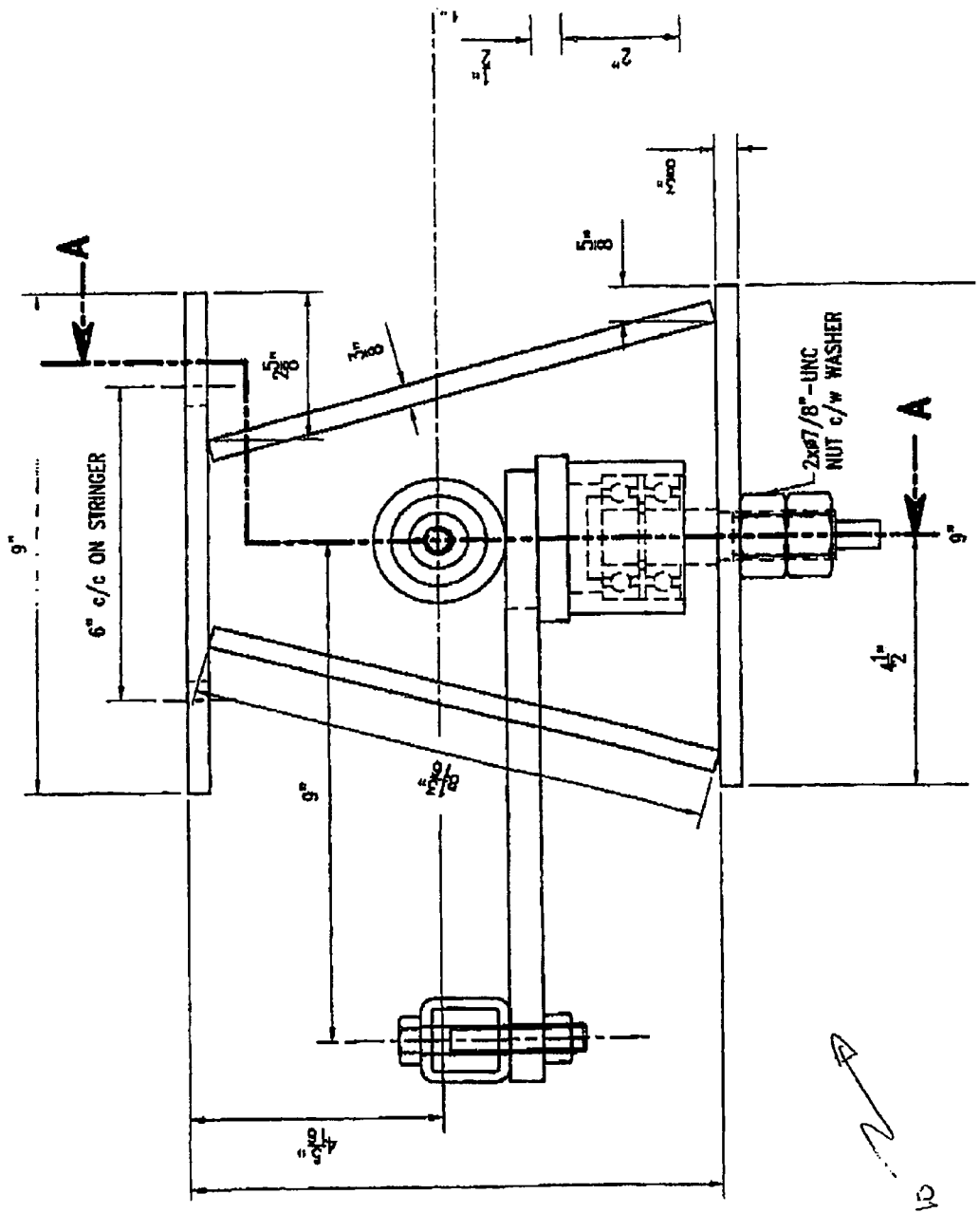
FIG. 4 is a side elevation view of the system of the present invention.
Figure 6:
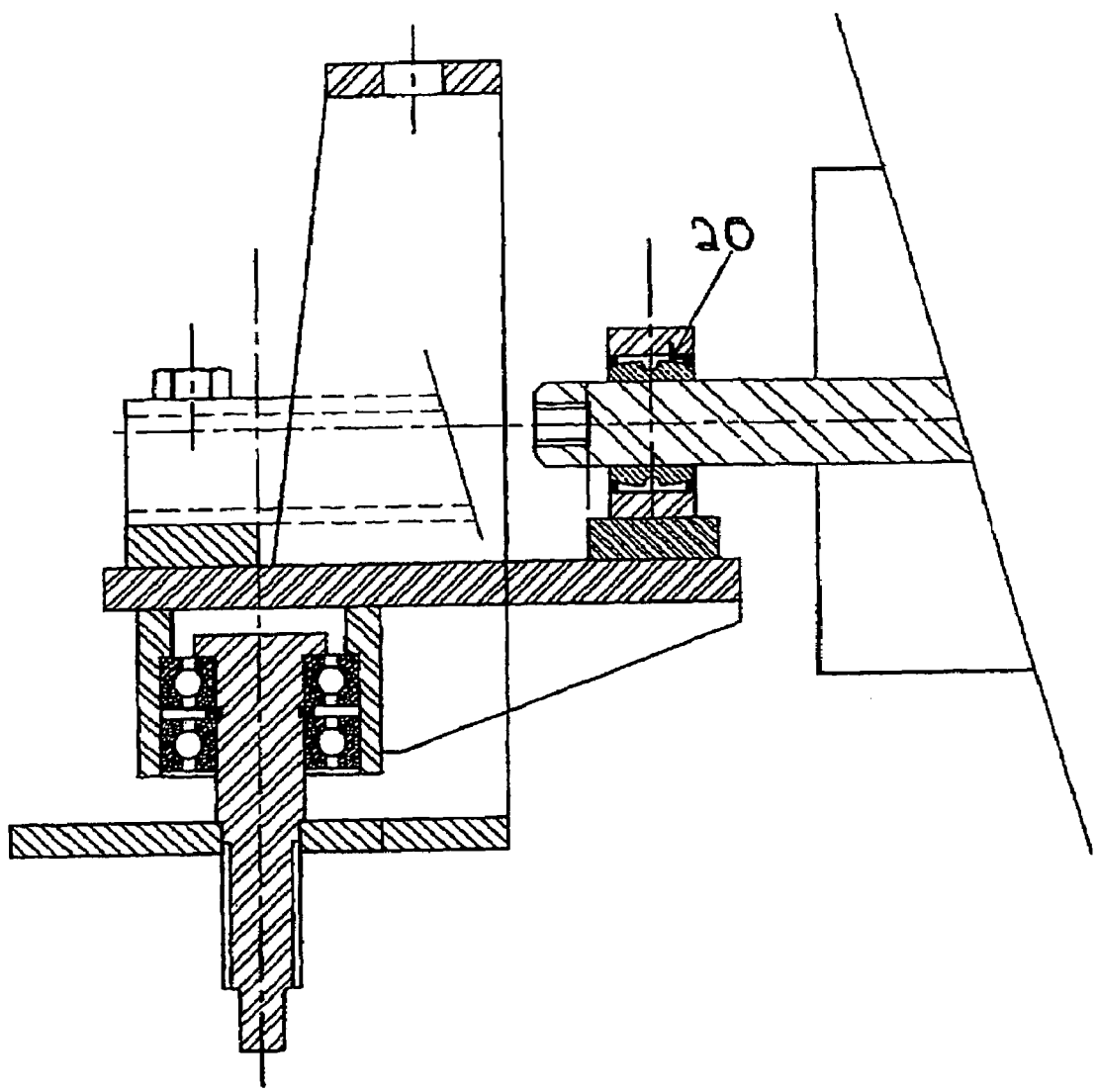
FIG. 6 is a sectional view taken along line A—A of FIG. 4.

The present invention is intended for use in combination with conveyors of the type having an elongated flexible endless belt trained over a head roller and a tail roller, said head roller being powered to rotate by a conveyor drive. A typical conveyor will include a relatively rigid conveyor frame holding the rollers in substantially parallel orientation for rotation about parallel rotational axes.

The conveyor belt is trained about the head and tail rollers thereby forming a working flight and a return flight. It is noted that the width and length of the belt may vary.

The alignment system 10 of the present invention includes two pivoting members 12, 14 (the pivoting assemblies), which are mounted on a support bracket 16 on either the working flight side or the return flight side of the conveyor belt. It is noted that numerous such support brackets 16 can be used depending on the overall length of said conveyor belt. The members 12, 14 further include castellated tracking rollers 28 set up in a bushing 20. It is noted that the rollers 28 could also be regular steel rollers and that they do not have to be castellated in all instances. Unlike tracking rollers 28 used in combination with other conveyor belt applications, the present invention provides for the conveyor belt crossing tracking rollers 28 before said belt reaches the guide rollers 26, thereby ensuring that said guide rollers 26 adjust the correct belt path rather than the mistracking path.

A guide or tracking control bar 22 will activate the pivoting mechanism provided by the pivoting members 12, 14, above described, through torque arms 24 of said pivoting members 12, 14 said control bar 22 requiring two guide rollers 26 which are adaptedly adjusted to both edges of the belt for ultimately controlling lateral movement of said belt. As the torque arms 24 move, each pivot assembly will rotate in the opposite direction. Since ends of the tracking roller support shaft are positioned into the bushing 20 at each end of the pivot assemblies, as the assemblies rotate, the tracking rollers 28 will move the belt in a direction laterally opposite to the activated guide roller 26. This movement is ultimately made possible by the arrangement of the pivot axes of the pivot assemblies and the slot provided in the vertical portions of the pivot members 12, 14.

In operation, as the belt travels along the conveyor, the guide rollers 26 will follow the lateral movement of said belt thereby continuously monitoring and controlling the belt alignment and axis. On the return flight side of the conveyor belt, the support bracket 16 and pivoting members 12, 14 are mounted onto the stringers. This in turn will prevent any build up material from jamming the pivoting members 12, 14 and tracking rollers 28.

The operator would therefore start the conveyor belt then adjust the tracking control bar 22 first manually to ensure said belt is centrally aligned on the conveyor. One would then stop the conveyor and ensure that the tracking control bar 22 is parallel and that the tracking rollers 28 are perpendicular to the belt before installing the adjustable guide rollers 26 in the aperture provided in the tracking control bar 22.

The guide rollers 26 are adjusted to about a ¼ inch from the edge of each side of the belt.

As the conveyor belt is operated, the belt when travelling off the pre-set centreline will activate the guide rollers 26 thereby causing the pivoting members 12,14 to initiate tracking roller 28 movement about a pivot axis in order to steer the belt back to its centrally pre-set position.

Other embodiments and uses of the invention will be apparent to those skilled in the art from consideration of the specification and practice of the invention disclosed herein. The specification and examples should be considered exemplary only and do not limit the intended scope of the invention.

I claim:

1. An alignment system for a conveyor having a conveyor belt trained over rollers on a conveyor frame, the system comprising:
   pivoting members each mounted on a corresponding support bracket, said pivoting members configured for supporting tracking rollers at corresponding tracking roller shaft ends, each said shaft end pivotally and non-rotatably attached to corresponding pivoting members by a ball bushing mounted in a corresponding one of each of said pivoting members; and
   a guide control bar having two ends extending laterally outside of said conveyor frame and being pivotally connected at each said end to a corresponding torque arm that is located laterally outside of said conveyor frame and fixedly connected to said corresponding pivoting member, said bar including guide rollers adaptedly positioned at both edges of the conveyor belt for lateral control of said belt.

2. An alignment system according to claim 1 wherein the support brackets are positioned either on a working flight side or return flight side of the conveyor belt.

3. An alignment system according to claim 2 wherein when the support brackets are positioned on the return flight side of the conveyor belt said belt may ride either on top or under steering rollers.

4. An alignment system according to claim 1 wherein it is positioned and attached as a retrofit unit to existing conveyors.

5. An alignment system according to claim 1 wherein said tracking rollers are castellated.

6. An alignment system for a conveyor having a conveyor belt trained over rollers on a conveyor frame, the system comprising:
   pivoting members each mounted on a corresponding support bracket, said pivoting members configured for supporting tracking rollers at corresponding tracking roller shaft ends, each said shaft end pivotally and non-rotatably attached to corresponding pivoting members by a ball bushing mounted in a corresponding one of each of said pivoting members; and
   a guide control bar having two ends extending laterally outside of said conveyor frame and being pivotally connected at each said end to a corresponding torque arm that is located laterally outside of said conveyor frame and fixedly connected to said corresponding pivoting member, said bar including guide rollers, each adjustably positioned in a corresponding aperture on ends of the guide control bar for lateral control of said belt;
   wherein said pivoting member is pivotable about an axis transverse to a longitudinal axis defined by said tracking roller shaft;
   said guide control bar being connected at each end to said corresponding tracking roller shaft end at only two pivot points.

* * * * *